No. 733,972. PATENTED JULY 21, 1903.
P. KENNEDY.
METHOD OF FROSTING GLASS BULBS OR GLOBES.
APPLICATION FILED DEC. 26, 1902.
NO MODEL.
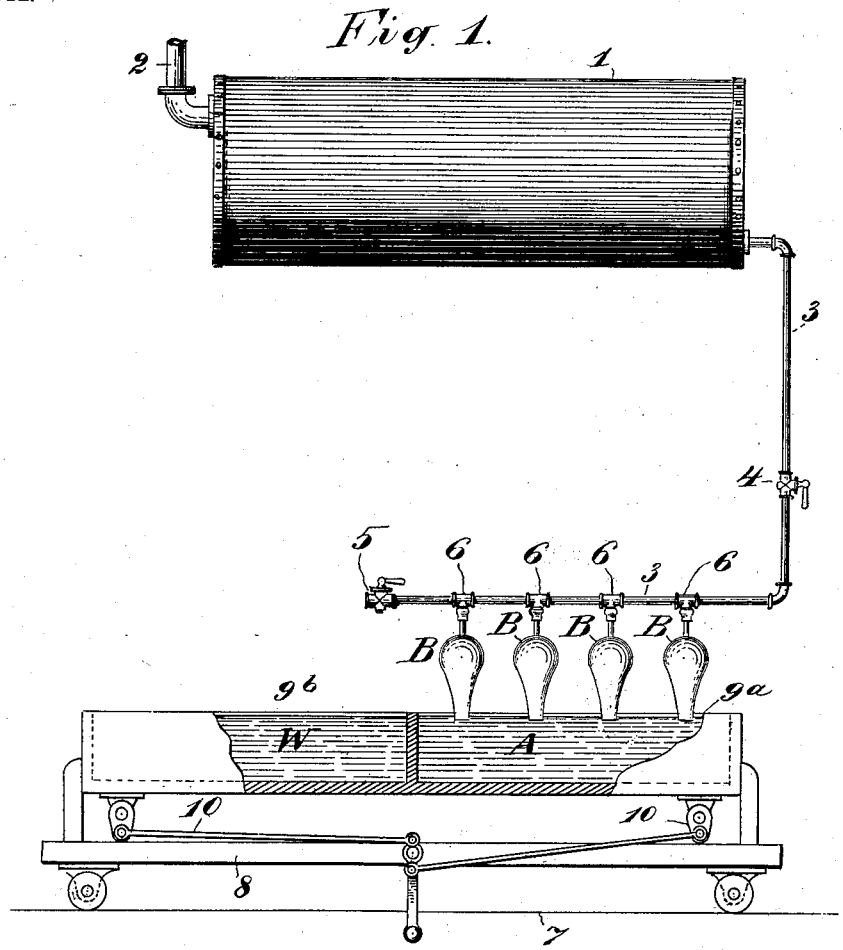
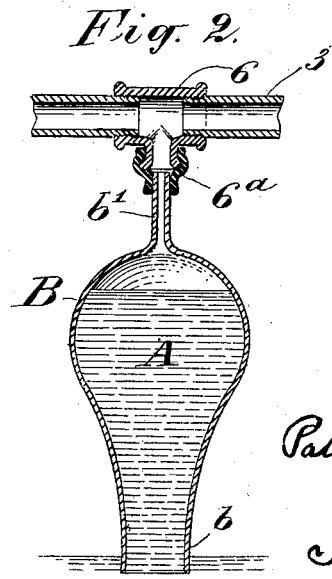

No. 733,972. Patented July 21, 1903.

UNITED STATES PATENT OFFICE.

PATRICK KENNEDY, OF NEW YORK, N. Y., ASSIGNOR TO CONSOLIDATED RAILWAY ELECTRIC LIGHTING AND EQUIPMENT COMPANY.

METHOD OF FROSTING GLASS BULBS OR GLOBES.

SPECIFICATION forming part of Letters Patent No. 733,972, dated July 21, 1903.

Application filed December 26, 1902. Serial No. 136,611. (No model.)

*To all whom it may concern:*

Be it known that I, PATRICK KENNEDY, a citizen of the United States, residing in the borough of Brooklyn, county of Kings, and city and State of New York, have invented certain new and useful Improvements in Methods of Frosting Glass Bulbs or Globes, of which the following is a specification.

This invention relates to a method of frosting the interior surfaces of glass bulbs or globes—such as those employed in incandescent lamps, for example.

The ordinary hollow glass bulb for an incandescent lamp has a globular or pear-shaped body, and when it comes from the glass-blower the bulb has a stem or neck at one end and a rather slender tube or stem at its crown or opposite end. This latter stem is employed for producing the final vacuum in the globe, after which it is sealed by melting and the surplus of the tube or stem removed or broken off.

The object and purpose of the present invention is to produce on the inner surface of the bulb a frosted appearance, which may cover the whole of the said inner surface or only a part thereof, as will be hereinafter explained. To effect this object, according to the present invention I charge the upright bulb through its lower tubular stem with an etching or corroding acid—as hydrofluoric acid, for example—by pressure on the body of said acid, and after it shall have produced the desired effect by corroding or etching the inner surface of the hollow bulb the acid is allowed to flow out by gravity, the pressure being balanced or removed. In order to cleanse the bulb thoroughly of the acid, the above operation is repeated with water, which rinses out the bulb. This result may be effected by immersing the lower stems or necks of the bulbs in the acid or liquid in a closed receptacle and putting air-pressure on the liquid, so as to cause it to rise in the bulbs to the desired extent, or it may be done by using an open liquid-receptacle and exhausting the air from the bulbs at their upper stems. In this case the pressure on the liquid acid or water will not exceed that of the atmosphere.

In order that my method of frosting may be the better understood, I have shown in the accompanying drawings a means or apparatus which may be employed for carrying it out, and in these drawings—

Figure 1 is a side elevation, on a small scale, of the entire apparatus; and Fig. 2 is a sectional detail view on a much larger scale.

1 designates a drum or vessel, commonly called a "vacuum reservoir or chamber," the air being continuously drawn therefrom through a pipe 2 by any known form of vacuum-producing pump or apparatus. Connected with the drum 1 is a pipe 3, having in it two cut-off cocks 4 and 5, and between these cocks in a horizontal portion of the pipe 3 are couplings 6 for the attachment of the glass bulbs B. Fig. 2 shows a convenient form of coupling. The bulb B has tubular stems at its opposite ends—that is to say, the neck $b$ and the tube $b'$ at the crown. The bulb is coupled and suspended by inserting the tube $b'$ up into a rubber sleeve or collar $6^a$, forming part of the coupling 6.

On a suitable bed or table 7, Fig. 1, is mounted a carriage 8, and on this carriage is mounted a receptacle 9, partitioned to form an acid-compartment $9^a$ and a water-compartment $9^b$. This receptacle is seen partly in section in Fig. 1 to show the liquids therein—namely, the acid A and water W.

Some suitable means, as 10, is provided for conveniently raising and lowering the receptacle 9.

The operation is as follows: The receptacle 9 being lowered or depressed, the bulbs B are attached to and suspended from the couplings 6 by their stems $b'$. The carriage 8 is now shifted until the acid-compartment $9^a$ is under the bulbs. The receptacle is now elevated by the means 10, which causes the necks $b$ of the suspended bulbs to dip in the acid. The cock 4 is now gradually opened, and the exhaustion of the air from the bulbs causes the acid to rise in the same uniformly to the desired height or level, after which the cock 4 is closed. When the acid shall have remained in the bulbs long enough to serve its purpose, the cock 5 is opened, so as to admit air to the bulbs, when the acid will at once flow out of them by gravity. The receptacle 9 is now lowered and shifted until the bulbs are over the compartment containing the water W and then again elevated until the necks of the bulbs dip into the water. The cock 5 is now closed and the cock 4 opened, when the water rises in the bulbs and fills them. Cock 4 is now closed and cock 5 opened to allow the water to run out. This filling with water and emptying may be repeated to an extent sufficient to thoroughly cleanse the bulbs, after which they are removed and dried. This process of washing is desirable, as it avoids the liability of water containing acid coming in contact with the exterior surface of the bulb.

Obviously bulbs may be treated singly by this process, and any known air-exhausting means may be employed.

By "acid" is here meant any liquid capable of producing the frosting or appearance called "frosting" on the surface of the glass. Usually hydrofluoric acid or its compounds are employed for acting on or etching on glass, and this art is now well understood. My invention relates to a new method of effecting the frosting on the inner surfaces of the bulbs, globes, or the like, so as to leave the outer surface of the same smooth or polished as it comes from the glass-blower. Obviously it is not essential that the hollow glass article shall be actually bulbous or globular. It might be partially or wholly cylindrical, for example.

Having thus described my invention, I claim—

1. The herein-described method of frosting the interior surface of a hollow bulb or the like of glass and having openings at top and bottom, which consists in immersing the open lower end of the bulb into a corroding liquid and forcing the liquid to rise in the same by air-pressure, then removing said pressure and permitting the liquid to flow out of the bulb by gravity, then rinsing out the bulb with water to cleanse it of acid, and then drying the bulb.

2. The herein-described method of frosting the interior surface of a bulb or the like of glass and having openings at top and bottom, which consists in first charging the bulb with a corroding liquid, then allowing said liquid to flow out, then forcing water to rise in the bulb by air-pressure, then removing said pressure and permitting the water to run out, and then drying the bulb.

3. The herein-described method of frosting a glass bulb or globe interiorly, which consists in first exhausting the air from the upper end of the bulb while the lower end is immersed in the corroding liquid, whereby the latter is caused to rise to the desired level in the bulb, then after the corroding liquid has effected the desired result, admitting air to the upper end of the bulb for evacuating the bulb by gravity, and then washing out the bulb with water and drying same.

4. The herein-described method of frosting the interior surface of a hollow bulb or the like of glass and having openings at top and bottom, which consists in immersing the open lower end of the hollow article in a frosting liquid, and forcing the liquid to rise in the same by air-pressure, the removing of said air-pressure and permitting the liquid to flow out by gravity, and then removing and drying the article.

In witness whereof I have hereunto signed my name, this 24th day of December, 1902, in the presence of two subscribing witnesses.

PATRICK KENNEDY.

Witnesses:
PETER A. ROSS,
WILLIAM J. FIRTH.